United States Patent Office 3,472,773
Patented Oct. 14, 1969

---

3,472,773
METHOD OF PREPARING CALCIUM SALTS OF BIS(2-HYDROXYALKYLBENZYL) DIAMINO-ALKANE LUBE OIL COMPOSITION
Edward H. Holst, Nederland, and George B. Kirkwood, Port Arthur, Tex., assignors to Texaco Inc., New York, N.Y., a corporation of Delaware
No Drawing. Continuation-in-part of application Ser. No. 586,024, Oct. 12, 1966. This application Oct. 1, 1968, Ser. No. 764,324
Int. Cl. C10m 1/32; C07c 85/08, 87/25
U.S. Cl. 252—42.7   5 Claims

ABSTRACT OF THE DISCLOSURE

A method of preparing calcium salts of bis(2-hydroxyalkylbenzyl) diaminoalkane comprising contacting bis(2-hydroxyalkylbenzyl) diaminoalkane with calcium oxide and water in the presence of a lubricating oil, a liquid hydrocarbon having a boiling point between 30 and 175° C. and an alkanol of 1 to 6 carbons or alkoxyalkanol of 3 to 10 carbons wherein the mole ratio of said water to said calcium oxide is at least about 0.28:1.

---

This application is a continuation-in-part of our copending application, Ser. No. 586,024, filed Oct. 12, 1966, now abandoned.

The invention relates to a method of preparing a lubricating oil concentrate containing a calcium salt of bis(2-hydroxyalkylbenzyl) diaminoalkane.

The bis(2-hydroxyalkylbenzyl) diaminoalkane reactant hereinafter referred to is classed in the art as a Mannich base. It can be more accurately described as the 2:2:1 mole ratio condensation product of alkylphenol, formaldehyde and diaminoalkane resulting from the reaction of these three constituents with one another at elevated temperature, e.g., 100–200° F. (followed by stripping, e.g., up to 300° F.) with said condensation product and water by-product being formed. The structure of the condensation product is not specifically known but is theorized to be as hereinafter described. Therefore, the specific names and structural formulas denoting said condensation product and its calcium salt derivative hereinbefore and hereinafter described are merely set forth as representative and are not intended to limit the invention to the particular chemical structure represented by said names and formulas.

The calcium salts of bis(2-hydroxyalkylbenzyl)diaminoalkane are useful as oxidation and corrosion inhibitors in lubricating oils such as those employed in the crankcase of automobiles and in railway diesel engines. These calcium salts generally comprise between about 2 and 20 wt. percent of the finished lubricant composition. In order to facilitate their introduction into the finished lubricant they are normally introduced in lube oil concentrates, said concentrates advantageously containing at least about 10 wt. percent of the calcium salt and up to 70 wt. percent and higher.

Prior to the subject invention the preparation of the calcium salt of bis(2-hydroxyalkylbenzyl)diaminoalkane by the direct reaction of lime with bis(2-hydroxyalkylbenzyl) diaminoalkane was extremely unsatisfactory due to slowness or non-existance of a reaction resulting in relatively low or non-existant yields of desired calcium salt products.

We have discovered, and this constitutes our invention, a method of preparing the calcium salt of bis(2-hydroxyalkylbenzyl) diaminoalkane in high yields in a relatively rapid manner utilizing the direct neutralization of bis(2-hydroxyalkylbenzyl) diaminoalkane with lime.

More particularly, our method comprises preparing a lube oil concentrate containing between about 10 and 70 wt. percent of a calcium salt characterized by the formula:

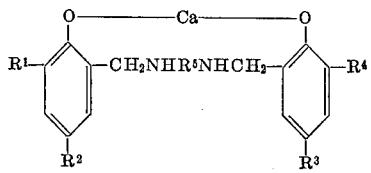

where $R^1$ and $R^4$ are hydrogen or a monovalent saturated aliphatic hydrocarbon radical (alkyl) of from 1 to 30 carbons, $R^2$ and $R^3$ are alkyl radicals having from 4 to 30 carbons and $R^5$ is polymethylene of from 2 to 10 carbons, by contacting calcium oxide, $H_2O$ and bis(2-hydroxyalkylbenzyl)diaminoalkane characterized by the formula:

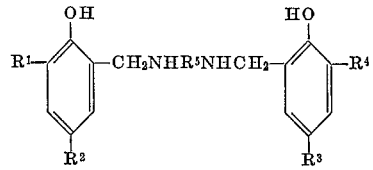

where $R^1$, $R^2$, $R^3$, $R^4$ and $R^5$ are as heretofore defined in the presence of (a) an alcohol selected from the group consisting of alkanol of from 1 to 6 carbons and alkoxyalkanol of from 3 to 10 carbons, (b) a liquid hydrocarbon having a boiling point between about 30 and 175° C. and (c) a lubricating oil, said alcohol being present in an amount between about 2 and 20 wt. percent, said liquid hydrocarbon being present in an amount between 2 and 20 wt. percent and said lubricating oil being present in an amount between about 30 and 90 wt. percent based on said reaction mixture, said calcium oxide, water and diaminoalkane reactant being present in a mole ratio of between about 1:0.28:0.5 and 1:3:0.2, preferably between about 1:0.28:0.5 and 1:1:0.5.

The lube oil concentrate containing the desired calcium salt product is recovered by standard means such as fractional distillation to remove the alcohol, liquid hydrocarbon and free water found in the final reaction mixture followed by filtration of the distillation residue through a filter cake such as diatomaceous silica at a temperature between about 90 and 220° C. under a pressure of between about 10 and 100 p.s.i.g. in order to remove any noncolloidal solid products and recovering the desired lube oil concentrate as filtrate.

Under preferred conditions, during the reaction the reaction mixture is continually blown with an inert gas such as nitrogen, e.g., at a rate of between about 0.0001 and 0.002 cu. ft./min./lb. reaction mixture in order to facilitate contact and removal of gaseous by-products as well as to prevent any possible undesired oxidation resulting from the interaction of the atmosphere with the reactants.

The following equations further illustrate the method of the invention utilizing bis(2-hydroxy-5-octylbenzyl)-1,2-diaminoethane as the diaminoalkane reactant and methanol and toluene as the alcohol and liquid hydrocarbon respectively.

MAIN REACTION

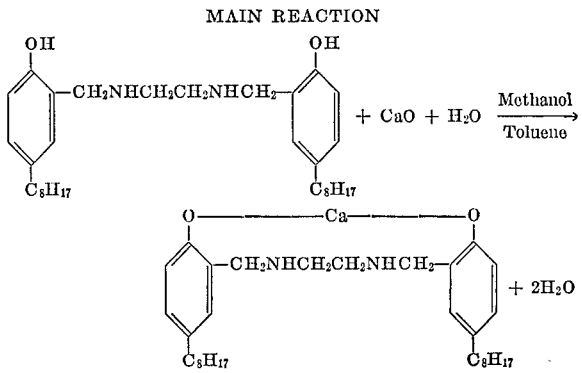

One important feature of the method of the invention is to have a mole ratio of water to calcium oxide of at least about 0.28:1 in the initial reaction mixture. A lower initial mole ratio of water to calcium oxide results in negligible yields of calcium salt product.

Another important feature of the method of the invention is the dual solvent system of alcohol and liquid hydrocarbon as defined. This dual system appears to function in a reaction promoter capacity. Omission of either or both of the liquid hydrocarbon and alcohol from the reaction mixture results in negligible or a complete absence of yield of desired calcium salt product.

Specific examples of the diaminoalkane reactant contemplated herein are bis((2-hydroxy-5-t-octylbenzyl)-1, 2-diaminoethane, bis(2-hydroxy-5-butylbenzyl)-1,3-diaminopropane, bis(2 - hydroxy - 5 - hexadecylbenzyl)1,2-diaminopropane, bis(2-hydroxy-3,5-didodecylbenzyl)-1,4-diaminobutane, bis(2-hydroxy-5-eicosylbenzyl) - 1,2-diaminoethane and bis(2-hydroxy-5-$C_{10}$-$C_{12}$-alkylbenzyl)1,2-diaminoethane. The latter product is derived from an alkylated phenol reactant which is in turn formed by reacting phenol with a propylene tetramer. The resultant product is a mixture of para alkylated phenols having para alkyl groups of from 10 to 12 carbons. Therefore, the mixture of para alkylated phenols when further reacted to form the diaminoalkane reactant form a mixture of diaminoalkane products, and this is denoted by the $C_{10}$-$C_{12}$ alkyl symbolism.

Specific examples of the alkanols contemplated herein are methanol, isopropanol, butanol and 2-methoxyethanol.

Examples of the liquid hydrocarbon element of the dual reaction medium are liquid paraffinic or aromatic hydrocarbons such as isoheptane, toluene, hexane, xylenes, cumene and petroleum naphtha.

Specific examples of the lubricating oils contemplated herein are naphthenic and paraffinic petroleum base mineral lubricating oils having SUS viscosities between about 50 and 300 at 100° F. Other examples are the synthetic lubricating oils such as the liquid polyalkylene and polyoxyalkylene polymers of a molecular weight between about 400 and 1500 such as polypropylene (800 M.W.) and polyoxypropylene (800 M.W.). Still other examples of synthetic lubricating oils are dicarboxylic acid esters such as esters of adipic and azelaic acids with alcohols such as butyl, 2-ethylhexyl and dodecyl alcohols and esters of acids of phosphorus such as diethyl esters of decane-phosphonic acid and tricresylphosphate.

The following examples further illustrate the method of the invention but are not to be construed as limitations thereof.

EXAMPLE I

To a one liter flask fitted with a stirrer, thermometer, reflux condenser and heating mantle there was charged 25 mls. of wet methanol, 25 mls. toluene, 12.9 grams calcium oxide, 300 grams of a lube oil solution comprising 142 grams naphthenic base petroleum oil of an SUS viscosity at 100° F. of 100 and 158 grams of bis (2-5-$C_{10}$-$C_{12}$-alkylbenzyl)-1,2-diaminoethane. Water was present in the resultant mixture in a mole ratio of water to calcium oxide of about 0.28:1, and the mixture was refluxed for 2 hours at a temperature of 75° C. At the end of the two hour period the mixture was stripped free of residual methanol, toluene and water by passing nitrogen at a rate of 0.02 c.f.m. (cu. ft./minute) therethrough at 165° C. The stripped residuum was filtered through a 0.1 ft.² steam-jacketed, diatomaceous silica precoated filter at 177° C. under 15 p.s.i.g. nitrogen to obtain the clarified lubricating oil concentrate containing 53.8 wt. percent of a salt characterized as the calcium salt of bis(2-hydroxy-5-$C_{10}$-$C_{12}$-alkylbenzyl)-1,2-diaminoethane. Analysis of the lube oil concentrate filtrate found Ca=2.6 wt. percent, Total Base Number=138, Sulfated Ash=8.9 wt. percent, Nitrogen=2.5 wt. percent, Kin. Visc. at 210° F. (cs.)=80. The calcium content corresponded to about 95% conversion to said calcium salt.

EXAMPLE II

To a one liter flask fitted with stirrer, thermometer, reflux condenser and heating mantle there was charged 12.9 grams calcium oxide, 25 mls. of wet methanol, 25 mls. isoheptane and 300 grams of a lube oil concentrate consisting of 142 grams of naphthenic mineral lubricating oil of an SUS viscosity of 100 at 100° F. and 158 grams of bis(2-hydroxy-5-$C_{10}$-$C_{12}$-alkylbenzyl)-1,2-diaminoethane. Water was present in the resultant mixture in a mole ratio of water to calcium oxide of about 0.28:1. The mixture was refluxed for 2 hours at 69° C. and then subsequently stripped free of methanol and isoheptane by passing nitrogen through said mixture at a rate of 0.02 c.f.m. at 165° C. for a period of 1 hour. The distillation residuum was then filtered through a 0.1 ft.² steam jacketed diatomaceous silica-precoated filter at 350° F. under 15 p.s.i.g. nitrogen pressure. The resultant clarified lube oil concentrate contained 53.8 wt. percent of a calcium salt characterized as the calcium salt of bis(2-hydroxy-5-$C_{10}$-$C_{12}$-alkylbenzyl)1,2-diaminoethane. Analysis of the filtrate found Ca=2.6 wt. percent, TBN=139, N=2.5 wt. percent, Kin. Visc. (cs.) at 210° F.=84, Sulfated Ash=7.6 wt. percent. The calcium content again corresponded to about 95% conversion to the calcium salt.

EXAMPLE III

This example illustrates the importance of the dual solvent combination.

Three runs were made. In Run A no solvent was employed, in Run B only methanol was utilized and in Run C only isoheptane was employed as solvent. The procedures for the particular runs are as follows:

Run A—To a one liter flask fitted with a stirrer, thermometer, reflux condenser and heating mantle there was charged 300 grams of a lube oil solution containing 142 grams naphthenic mineral lubricating oil of an SUS viscosity of 100 at 100° F. and 158 grams of bis(2-hydroxy-5-$C_{10}$-$C_{12}$-alkylbenzyl)-1,2-diaminoethane, 27 grams of calcium oxide and added water. Water was present in the resultant mixture in a mole ratio of calcium oxide to water of about 1:0.28. The mixture was heated to and reacted at 177° C. for 1 hour. The resultant product was filtered utilizing 12 grams of diatomaceous silica as filter aid. The resultant lube oil filtrate was analyzed and found to contain only a trace amount of calcium (theory 2.88 wt. percent) indicating no measurable amounts of reaction product between the calcium oxide and diaminoethane reactant.

Run B—To a 2 liter pressure reactor there was charged 50 grams wet methanol, 12.9 grams calcium oxide, 300 grams of a lube oil solution of 142 grams naphthenic lubricating oil of an SUS viscosity of 100 at 100° F. and 158 grams of bis(2-hydroxy-5-$C_{10}$-$C_{12}$-alkylbenzyl)-1,2-diaminoethane. Water was present in the resultant mixture in a mole ratio of water to calcium oxide of about 0.28:1. It was heated under autogeneous pressure for 1 hour at 100° C. and the pressure reached 50 p.s.i.g. At the end of the one hour period the reaction mixture was stripped of methanol by passing 0.03 c.f.m. $N_2$ through the reaction mixture for one hour at 177° C. The stripped product was filtered through 0.1 ft.[2] steam-jacketed, diatomaceous silica precoated filter at 177° C. under 15 p.s.i.g. nitrogen pressure, utilizing 12 grams diatomaceous silica as filter aid. Analysis of the filtrate found only a trace amount of calcium (theory 2.73 wt. percent) indicating that no measurable reaction occurred between the calcium oxide and diaminoethane reactant.

Run C—The procedure of Example II was duplicated except 50 mls. of isoheptane were substituted for the isoheptane-methanol mixture. Further, 19.4 grams of calcium oxide were used rather than 12.9 grams, and the water ratio of Example II was utilized. In addition, during the filtration 12 grams of diatomaceous silica filter aid were employed. Analysis of the filtrate found only a trace amount of calcium (theory 2.73 wt. percent) indicating no measurable amount of reaction product formed between the diaminoethane reactant and calcium oxide.

Trace amount in the foregoing runs denotes less than about 0.10 wt. percent.

EXAMPLE IV

This example illustrates the criticality of maintaining at least about 0.28:1 mole ratio of water to calcium oxide.

The procedure employed was essentially the same as described in Example II. Two hundred fifty grams of a lube oil concentrate consisting of 125 grams of naphthenic mineral lubricating oil of an SUS viscosity of 100 at 100° F. and 125 grams of bis(2-hydroxy-5-$C_{10}$-$C_{12}$-alkylbenzyl)-1,2-diaminoethane were charged with 13.8 grams of calcium oxide, 18.1 grams of methanol, 14.2 grams of isoheptane and varying amounts of added water. The results are summarized in the following table:

| Run No. | Water added, g. | Total $H_2O$, mole $H_2O$/CaO [1] | Calcium wt. percent [2] |
|---|---|---|---|
| AA | 0.45 | 0.16:1 | 0 |
| BB | 0.60 | 0.19:1 | 0 |
| CC | 0.60 | 0.19:1 | 0.2 |
| DD | 0.90 | 0.26:1 | 0.4 |
| EE | 0.90 | 0.26:1 | 0.4 |
| FF | 1.0 | 0.28:1 | 2.9 |
| GG | 1.1 | 0.30:1 | 2.9 |
| HH | 1.1 | 0.30:1 | 2.9 |
| II | 1.6 | 0.42:1 | 2.8 |
| JJ | 1.8 | 0.46:1 | 2.9 |

[1] Water present during neutralization.
[2] Wt. percent Ca in form of calcium salt of bis(2-hydroxy-5-$C_{10}$-$C_{12}$-alkylbenzyl)-1,2-diaminoethane in the filtrate.

As can be seen from the above there is a sharp increase in the production of the calcium salt when water contents of a mole ratio of water to CaO exceeding 0.28:1 are attained.

In foregoing Examples I through IV, the water present in the reaction mixture was primarily derived from impurity water associated with the other ingredients particularly methanol.

We claim:
1. A method of producing a lube oil composition containing between about 2 and 20 wt. percent of a calcium salt characterized by the formula:

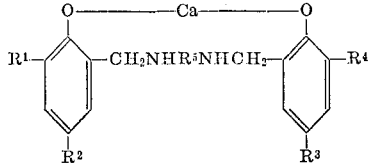

where $R^1$ and $R^2$ are hydrogen or alkyl of from 1 to 30 carbons, $R^3$ and $R^4$ are alkyl of from 4 to 30 carbons, and $R^5$ is polymethylene of from 2 to 10 carbons comprising contacting water, calcium oxide and 2:2:1 mole ratio condensation product of alkylphenol, formaldehyde and diaminoalkane characterized by the formula:

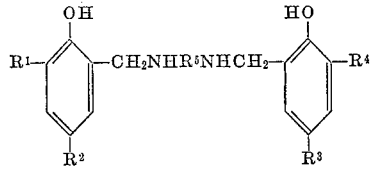

where $R^1$, $R^2$, $R^3$, $R^4$ and $R^5$ are as heretofore defined in the presence of liquid hydrocarbon of a boiling point between about 30 and 175° C., lubricating oil and an alcohol selected from the group consisting of alkanol of from 1 to 6 carbons and alkoxy-alkanol of from 3 to 10 carbons at a temperature between about 30 and 175° C., said calcium oxide, water and condensation product being present in a mole ratio of between about 1:0.28:0.5 and 1:3:0.2, said liquid hydrocarbon being present in an amount between about 2 and 20 wt. percent, said alcohol being present in an amount between about 2 and 20 wt. percent and said lubricating oil being present in an amount between about 30 and 90 wt. percent based on the reaction mixture.

2. A method in accordance with claim 1 wherein subsequent to said contacting, said alcohol, said liquid hydrocarbon and water is separated from the resultant reaction mixture and said resultant mixture is then filtered.

3. A method in accordance with claim 2 wherein said lubricating oil is a mineral lubricating oil of an SUS viscosity between about 50 and 300 at 100° F.

4. A method in accordance with claim 3 wherein said alcohol is methanol, said liquid hydrocarbon is isoheptane, said $R^1$ and $R^4$ are hydrogen, said $R^2$ and $R^3$ are $C_{10}$-$C_{12}$ alkyl and said $R^5$ is —$CH_2CH_2$—.

5. A method in accordance with claim 3 wherein said alcohol is methanol, said liquid hydrocarbon is toluene, said $R^1$ and $R^4$ are hydrogen, said $R^2$ and $R^3$ are $C_{10}$-$C_{12}$ alkyl and said $R^5$ is —$CH_2CH_2$—.

References Cited

UNITED STATES PATENTS 2,725,357  11/1955  Kluge et al. _____ 252—42.7
2,353,491   7/1944  Oberright _____ 252—42.7
2,361,803  10/1944  Wilson _____ 252—42.7

OTHER REFERENCES

Mellor: "Comprehensive Treatise on Inorganic and Theoretical Chem." Vol. 3, pp. 663–682, pub. by Longmans Green & Co. 1923.

DANIEL E. WYMAN, Primary Examiner

W. CANNON, Assistant Examiner

U.S. Cl. X.R.

260—570.5, 570.9